United States Patent Office 3,332,708
Patented July 25, 1967

3,332,708
TUBE COUPLING HAVING DEFORMABLE GRIPPING AND SEALING MEANS
George W. Jackson and Paul J. Long, Jr., Dayton, Ohio, assignors to General Motors Corporation, Detroit, Mich., a corporation of Delaware
Filed Aug. 28, 1964, Ser. No. 392,867
2 Claims. (Cl. 285—3)

ABSTRACT OF THE DISCLOSURE

In preferred form a tube coupling including an adjustable nut surrounding a hollow tube gripping member having a deformable nose portion on one end thereof and a torque resistant pre-assembly flange on the opposite end thereof and wherein the tube gripping member interior receives one end of a tube seal member having a radially outwardly directed tapered flange thereon adapted to be maintained in fluid sealing engagement between the tube gripping member and a coupling member threadably to the adjustable tube coupling nut.

---

Figure 1:
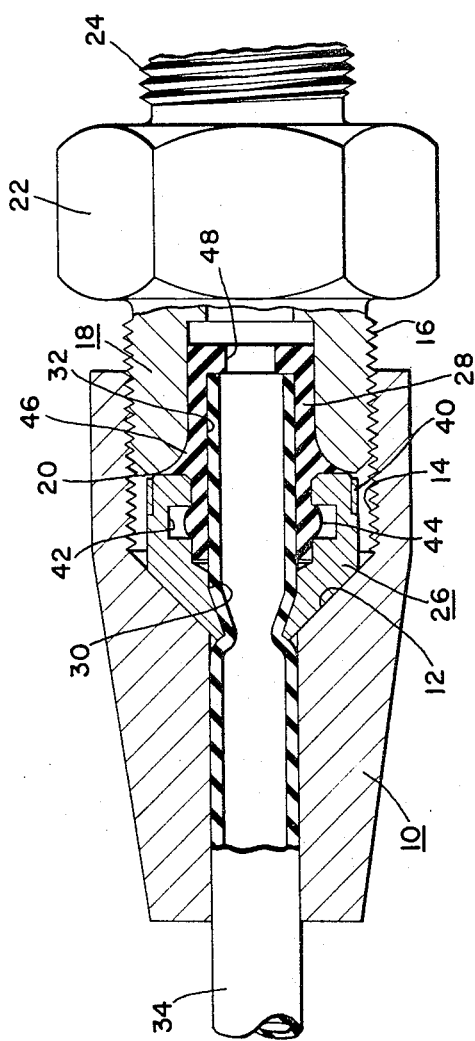

This invention relates to a coupling assembly and more particularly to a connector assembly for fastening a piece of tubing or the like to a valve, fitting, different diameter pipe, or other like kinds of members.

One problem in connecting a tube or the like to a valve or other fitting is that extremes in temperature, mechanical impacts, vibrations and other causes can effect a loosening of the connection that allows fluid leakage of the connection.

An object of the present invention, therefore, is to prevent leakage from the connection between tubing or the like and an associated valve or other like fitting by means of a quickly assembled connector construction including a tube supporting nut element receiving a tube retaining sleeve element and seal member concentrically therein wherein said seal member has a first portion concentrically arranged within said sleeve and a second portion overlying one end of said sleeve and wherein the sleeve and seal cooperate to supportingly receive the end of the tube and wherein a second tubular member is threadably received by said nut element for compressing said sleeve and seal member therebetween to concurrently hold the tube in place within the connector assembly and prevent fluid leakage exteriorly thereof.

A still further object of the present invention is to prevent fluid leakage exteriorly of a connector having threadably joined first and second tubular members by the provision of a tube supporting sleeve element and a resilient tube sealing element supported within said sleeve element both elements being located within said joined tubular parts to supportingly receive the end of a tube to be connected to the connector assembly wherein the sleeve includes a first deformable portion that grips the tube to hold it in place within the connector upon a predetermined threaded movement of one of the tubular members into the other member and wherein it includes a second deformable portion to limit such threaded movement to prevent inadvertent deformation of the first sleeve portion until the tube has been inserted into the connector.

A still further object of the present invention is to provide an improved economical functionally reliable tube connector and seal assembly including coaxially aligned nut, sleeve and seal elements wherein the sleeve is concentrically arranged within the nut element and the seal is concentrically arranged within the sleeve element and wherein a compression fitting is threadably received by the nut member to compress the sleeve and seal between the nut and compression fitting so that the sleeve member will grip a tube inserted therein to prevent movement thereof externally of the assembly and the seal will be compressed between the sleeve and compression fitting to prevent fluid leakage externally of the assembly.

Further objects and advantages of the present invention will be apparent from the following description, reference being had to the accompanying drawings wherein preferred embodiments of the present invention are clearly shown.

Figure 2:
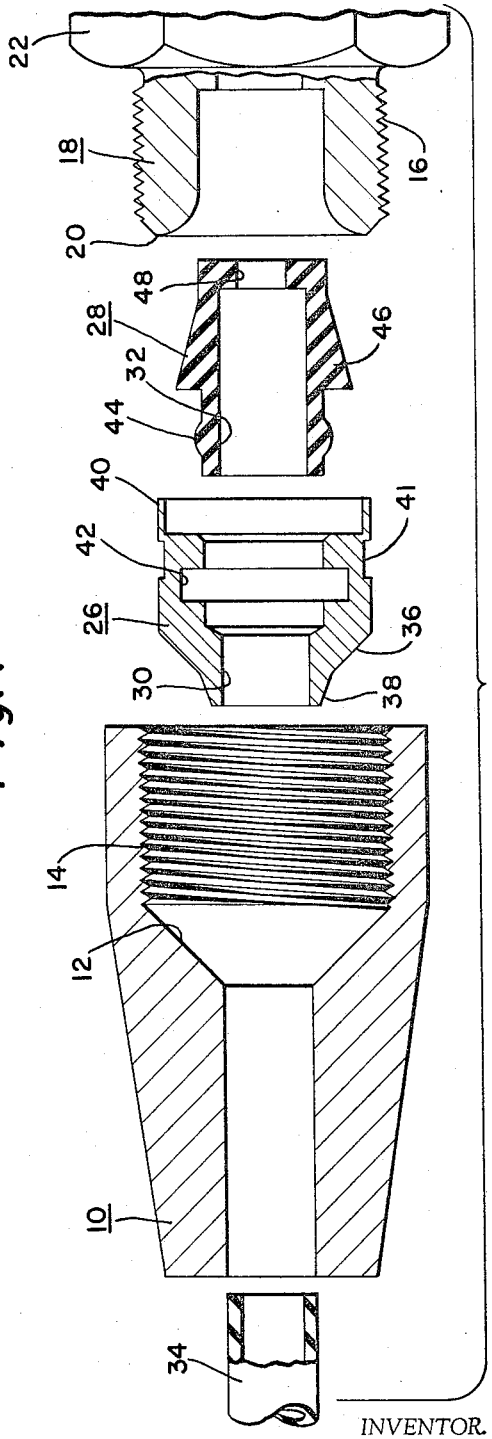

In the drawings:

FIGURE 1 is a view in longitudinal section of the improved connector assembly; and FIGURE 2 is an exploded view showing the parts of the connector arrangement prior to its being assembled.

Referring to the drawing in FIGURE 1, one embodiment of the connector assembly is illustrated including a first tubular member or tube nut 10 having an inclnied inner surface 12 and an internally threaded portion 14 that threadably receives external threading 16 on a compression fitting 18 having a nose portion 20. In the illustrated arrangement, the compression fitting 18 is representatively shown as being an adapter fitting having a hexagonally shaped outer surface 22 and another threaded end portion 24 to be connected to a valve or the like with it being understood that any other suitable threaded fitting would be equally suited for practicing the invention.

Within the tube nut 10 is located a sleeve element 26 and a seal element 28 having coaxially aligned openings 30, 32 therethrough for receiving the end of a tube member 34 to be connected by the assembly to a valve, large diameter conduit or the like by the assembly. The tube member 34, best suited for association with the assembly, is constructed of a suitable resilient material such as a rubber or a like plastic material.

The sleeve element 26 more particularly is shown in FIGURE 2 as including an inclined surface 36 on one end thereof that merges with a relatively thin sectioned annular nose portion 38 that is adapted to be crimped over from the configuration shown in FIGURE 2 prior to assembly into the configuration shown in FIGURE 1 following assembly. On the opposite end of the sleeve member 26 is formed an annular thin sectioned flange 40 that is adapted to be broken off and moved rearwardly into a flange receiving annular groove 41 in the outer periphery of sleeve 26, as shown in FIGURE 1.

Internally of the sleeve 26 is formed a large diameter opening 42 that supportingly receives an annular protuberance 44 on the seal member 28 for holding it in interlocking engagement with the sleeve 26 to prevent separation of these elements when the end of the tube 34 is inserted through the coaxially aligned openings 30, 32 therein. The seal assembly 28 also includes another outer surface portion 46 thereon shaped substantially as a truncated conical surface. The seal 28 also includes an end opening 48 therein to permit fluid flow from the tube 34 and through the tubular compression fitting 18.

One problem in connector assemblies of the illustrated type is that the assembly is often interconnected or assembled prior to the tube being inserted therein. In such cases, the connector assembly is shipped as a unit to a point of use where the tubing is inserted and then held in place by threading the fitting 18 into the nut 10. One problem with this arrangement is that where the fitting 18 is inadvertently threaded into the member 10 too far, first the seal 28 at the end adjacent compression fitting 18 is squeezed inwardly to block the opening therethrough and then the nose portion 38 is crimped over to prevent the tube from being inserted into the assembly.

One feature of the invention is the provision of the shoulder 40 which serves as a limit to threading movement of the fitting 18 into the nut 10 until the tube 34 is inserted into the assembly. By virtue of this arrangement, the sleeve and seal can be interconnected and concentrically located within the nut 10 and then the compression fitting 18 can be threaded into the nut until its nose 20 contacts the edge of the flange 40. At that point, a first substantial resistance is felt to warn a person that the sleeve nose will be crimped over if an additional threading force is applied. By virtue of the added resistance, a person will not squeeze the seal 28 and crimp over the nose portion 38. Thus, the tube can be inserted within the assembly at a later date quickly without worrying about blockage from an inadvertently crimped nose portion. Hence, this feature allows preassembly of the connector by the manufacturer to assure that a tube can be slipped in place easily at a point of use such as an auto assembly plant or the like.

Following insertion of the tube 34, the nose portion 20 is crimped into gripping relationship with the resilient tube by applying a suitable relative torque between the nut 10 and the compression fitting 18. Under such compression, the limiting flange 40 is sheared off and moved by the nose of the fitting 18 into groove 41. The radial outermost part of the seal surface 46 is compressed between the end of the sleeve 26 and the nose 20 to provide a good seal against fluid leakage between the adapter 18 and the sleeve element 26. When the flange 40 is so collapsed, further threading of the fitting 18 into nut 10 will move the sleeve 26 against the inclined surface 12 of the fitting 10 to cause the nose portion 38 thereon to be bent to an inclination substantially like that of surface 36 to grip the tube 34 in an interlocking relationship, as best seen in FIGURE 1. At this point, a second substantial resistance is felt indicating that the tube is securely held in a good tube sealing relationship within the connector assembly.

While the embodiments of the present invention as herein disclosed constitute preferred forms, it is to be understood that other forms might be adopted.

What is claimed is as follows:

1. A tube connector assembly comprising a tubular nut having a conical inner surface at one end thereof, a compression fitting threadably received by said tubular nut, a tubular sleeve concentrically arranged within said tubular nut having a nose portion on one end thereof and a collapsible annular flange on the opposite end thereof, said nose portion having a conically shaped outer surface engageable with said conical inner surface of said tubular nut, said tubular sleeve including an annular groove in the outer surface thereof axially spaced from said annular flange, said annular flange including a thin section segment thereon secured to the opposite end of said tubular sleeve and adapted to shear from said opposite end of said tubular sleeve when said compression fitting is threaded into said tubular nut a predetermined degree, said annular flange having the distal end thereof engaged by said compression fitting during threading thereof into said tubular nut for moving said annular flange into said peripheral groove on said tubular sleeve, a seal element concentrically arranged within said nut having a first portion coaxially mounted within said sleeve and a second portion located exteriorly of said sleeve including a radially outwardly directed outer shoulder thereon tapered in an axial direction, coacting means between said first portion of said seal element and said sleeve for holding said seal in place within said sleeve, said flange on said sleeve serving to limit relative threading movement between said compression fitting and said tubular nut for preventing inadvertent crimping of the nose portion of said sleeve prior to insertion of a tube into supported alignment within said sleeve, said flange being collapsible following a predetermined relative threaded movement between said compression fitting and said tubular nut causing said compression fitting to directly engage the opposite end of said tube engaging sleeve to exert a force thereon sufficient to direct the nose portion of said tube engaging sleeve against said conical inner surface of said tubular nut to permit crimping of said nose into the tube, said compression fitting engaging said seal element following collapse of said annular flange to compress the tapered shoulder of the seal between said compression fitting and the end of said sleeve to prevent fluid leakage exteriorly of the connector assembly.

2. A fluid connector assembly comprising, a first tubular fitting having an inclined inner surface and a first threaded portion thereon, a second tubular fitting having a second threaded portion thereon and a nose portion, said first and second tubular fittings being threadably connected by said first and second threaded portions thereon, a tube locking sleeve within said first tubular fitting having an inclined surface on one end thereof axially aligned and concentric to the inclined inner surface of said first tubular fitting, a thin section on said inclined surface engageable with the inclined surface of said first tubular fitting, said tube locking sleeve having an annular flange on the opposite end thereof extending axially of said first tubular fitting in the direction of said nose portion on said second tubular fitting, said tube locking sleeve including a peripheral groove located in axial alignment with said annular flange, a resilient seal element located within said tube locking sleeve including a peripheral shoulder thereon tapered toward one end of said seal element axially outwardly of said tube locking sleeve, said tapered peripheral shoulder on said seal element located between said nose portion of said second tubular fitting and said tube locking sleeve, coacting means on said seal element and said tube locking sleeve for holding said seal element against axial movement relative to said tube locking sleeve, said seal element including an axial opening therethrough for receiving the end of a tube inserted through said tube locking sleeve for supportingly receiving a tube within the connector assembly, said axially directed flange on said tube locking sleeve engageable with said nose portion of said second tubular fitting upon a predetermined relative threaded movement between said first and second tubular fittings to index against a second predetermined relative threaded movement between said first and second tubular fitting capable of shearing said annular flange from said tube locking sleeve and a subsequent movement of said tube locking sleeve axially within said first tubular fitting causing said thin section nose portion thereon to be deformed by said inclined inner surface of said first tubular fitting to cause said tube gripping sleeve to hold a tube in place against axial movement from said first tubular fitting.

References Cited

UNITED STATES PATENTS

| 1,862,833 | 6/1932 | Stover | 285—249 |
| 2,029,325 | 2/1936 | Kocher | 285—382.7 X |
| 2,523,874 | 9/1950 | Moore | 285—382.7 X |
| 2,529,552 | 11/1950 | Herold | 285—382.7 X |
| 2,544,108 | 3/1951 | Richardson | 285—3 |
| 3,004,776 | 10/1961 | Sebardt | 285—3 |

FOREIGN PATENTS

| 729,401 | 4/1932 | France. |
| 741,007 | 11/1932 | France. |
| 10,111 | 5/1903 | Great Britain. |
| 646,788 | 11/1950 | Great Britain. |
| 51,440 | 11/1941 | Netherlands. |

CARL W. TOMLIN, *Primary Examiner.*

THOMAS F. CALLAGHAN, *Examiner.*